(12) United States Patent
Tsuchiya et al.

(10) Patent No.: US 9,131,156 B2
(45) Date of Patent: Sep. 8, 2015

(54) AMOUNT-OF-SHAKE SENSING APPARATUS, IMAGING APPARATUS, AND METHOD FOR DETECTING THE AMOUNT OF SHAKE

(71) Applicant: Olympus Corporation, Tokyo (JP)

(72) Inventors: Hitoshi Tsuchiya, Tokyo (JP); Hisashi Takeuchi, Tokyo (JP); Kiyoshi Tanaka, Tokyo (JP); Yoshinobu Omata, Toyko (JP)

(73) Assignee: OLYMPUS CORPORATION, Tokyo (JP)

( * ) Notice: Subject to any disclaimer, the term of this patent is extended or adjusted under 35 U.S.C. 154(b) by 43 days.

(21) Appl. No.: 14/169,746

(22) Filed: Jan. 31, 2014

(65) Prior Publication Data

US 2014/0146191 A1    May 29, 2014

Related U.S. Application Data

(63) Continuation of application No. PCT/JP2013/052907, filed on Feb. 7, 2013.

(30) Foreign Application Priority Data

Jul. 31, 2012   (JP) .................. 2012-170150

(51) Int. Cl.
| | |
|---|---|
| *H04N 5/228* | (2006.01) |
| *H04N 5/232* | (2006.01) |
| *G03B 5/00* | (2006.01) |
| *G02B 27/64* | (2006.01) |

(52) U.S. Cl.
CPC .......... *H04N 5/23258* (2013.01); *G02B 27/646* (2013.01); *G03B 5/00* (2013.01); *H04N 5/232* (2013.01); *H04N 5/2328* (2013.01); *G03B 2217/005* (2013.01)

(58) Field of Classification Search
CPC .......... H04N 5/23251; H04N 5/23258; H04N 5/23264; G02B 27/646
USPC ............. 348/208.2, 208.3, 208.5, 208.7
See application file for complete search history.

(56) References Cited

U.S. PATENT DOCUMENTS

| | | | | |
|---|---|---|---|---|
| 5,978,600 | A | * 11/1999 | Takeuchi et al. | ........... 396/53 |
| 2012/0033954 | A1 | * 2/2012 | Wakamatsu | ........... 396/55 |
| 2012/0093493 | A1 | * 4/2012 | Wakamatsu | ........... 396/55 |

FOREIGN PATENT DOCUMENTS

| | | |
|---|---|---|
| JP | 07-225405 A | 8/1995 |
| JP | 2010-025961 A | 2/2010 |
| JP | 2010-091672 A | 4/2010 |
| JP | 2012-128356 A | 7/2012 |

\* cited by examiner

*Primary Examiner* — Twyler Haskins
*Assistant Examiner* — Quang Le
(74) *Attorney, Agent, or Firm* — Scully, Scott, Murphy & Presser, PC

(57) ABSTRACT

The apparatus of the invention is characterized by executing radius-of-rotation calculation operation for calculating a radius of rotation from a velocity change found by time integration of acceleration, and an angular velocity; velocity calculation operation in which during a given time from a start of exposure, velocity is calculated based on the angular velocity and the radius of rotation calculated before the start of exposure, and after a lapse of the given time, the acceleration is cumulatively added to the velocity detected during the given time to calculate the velocity, and amount-of-movement calculation operation for time-integrating the velocity calculated in the velocity calculation operation to calculate the amount of movement.

7 Claims, 8 Drawing Sheets

AMOUNT-OF-SHAKE SENSING APPARATUS, IMAGING APPARATUS, AND METHOD FOR DETECTING THE AMOUNT OF SHAKE

ART FIELD

The present invention relates to a sensing apparatus for detecting the amount of shakes occurring from camera-shake as an example, and an imaging apparatus incorporating such an amount-of-shake sensing apparatus.

BACKGROUND ART

In recent years, imaging apparatus (cameras) having the function of correcting camera-shake have gained popularity so that hand-held cameras can be used to take shake-free good images without recourse to tripods or the like yet without taking special heed.

However, the performance of correcting camera-shake is still less than satisfactory, and especially at the time of long-exposure photography, camera-shake often remains under-corrected: the camera-shake correction performance of the imaging apparatus has still some adverse influence on the quality of the images taken. Especially upon long-exposure photography in the so-called macro area, camera-shake correction performance available up to date often remains unsatisfactory.

Camera-shake may be broken down into two types: the so-called angular shake that occurs with changes in the angle of the optical axis of the imaging apparatus and the so-called parallel shifting shake that occurs with movement of the camera body in the direction vertical to the optical axis. Most camera-shake correction functions available up to date are limited to the correction of angular shake alone, and parallel shifting shake remains uncorrected. Although this parallel shifting shake is little noticeable especially in the case of low image magnifications, yet it has mounting influences on the quality of the images taken as the image magnification grows high. This is the reason why camera-shake correction functions available up to date remain unsatisfactory in the macro area.

Patent Publication 1 discloses an image shake correction camera comprising an acceleration sensor for detecting a triaxial acceleration acting on a camera, an angular velocity sensor for detecting a angular velocity around three axes acting on the camera, an attitude sensor means for calculating from a triaxial acceleration and an angular velocity around three axes a coordinate transform matrix between a camera coordinate system and a stationary coordinate system and a gravity acceleration component calculation means for calculating a gravity acceleration component in the camera coordinate system from the coordinate matrix, wherein the gravity acceleration component is subtracted from an output of the acceleration sensor to figure out a position of parallel shifting motion, and further comprising a correction drive amount calculation means 11 for working out an amount of image shake based on them.

PRIOR PUBLICATIONS

Patent Publication

Patent Publication 1: JP(A) 7-225405

SUMMARY OF THE INVENTION

The image shake correction camera of Patent Publication 1 is designed such that influences of gravity acceleration are removed from the results of detection of accelerations in the vertical and lateral directions with respect to the imaging plane of the camera to obtain an acceleration that is then integrated to work out a velocity that is then integrated to calculate an amount of parallel shifting movement.

Referring on the other hand to a single-lens reflex camera including a movable part such as a shutter or quick-return mirror, there is a problem with impacts upon movement of that movable part. Generally speaking, an acceleration sensor is sensible to impacts, and especially during the running of the shutter, it produces the result of detection different from an acceleration applied to the camera body under the influences of impacts. When the output coming from the acceleration is integrated as it stands, there will be a varying velocity calculated. To make appropriate correction for this, some means effective for impacts on the movable part would be in great need.

In this respect, however, the camera of Patent Publication 1 does not include any effective means. A particular object of the present invention is to provide an amount-of-shake sensing apparatus, an imaging apparatus, and a method of detecting an amount of shakes that, even when there are such impacts resulting from the movable part as mentioned above, enables any influence on the result of detection of shakes to be so eliminated that the amount of movement can precisely be detected.

Means for Solving the Problem

To this end, the present invention provides an amount-of-shake sensing apparatus, comprising:

an angular velocity sensor which detects an angular velocity concerning rotational motion of a casing, an acceleration sensor which detects an acceleration applied to the casing, a movement calculator which calculates an amount of movement of the casing based on the angular velocity and the acceleration, wherein:

the movement calculator executes:

a radius-of-rotation calculation operation for calculating a radius of rotation from a velocity change found by time integration of the acceleration and the angular velocity, a velocity calculation operation in which during a given time from a start of exposure, velocity is calculated based on the angular velocity and the radius of rotation calculated before the start of exposure, and after a lapse of the given time, the acceleration is cumulatively added to the velocity detected during the given time to calculate the velocity, and an amount-of-movement calculation operation for time-integrating the velocity calculated in the velocity calculation operation to calculate the amount of movement.

The present invention also provides an imaging apparatus, comprising:

an amount-of-shake sensing apparatus as defined above, an optical system which images light from an object as an object image, an imaging device which transforms an object image formed by the optical system into image signals, and a drive unit which drives at least one of the optical system and the imaging device in a direction of canceling out the amount of movement calculated by the amount-of-shake sensing apparatus.

Further, the present invention provides a method for detecting an amount of shakes, comprising step of A detecting an angular velocity concerning rotational motion of a casing, A detecting an acceleration applied to the casing, and An executing calculation operation for calculating an amount of movement of the casing based on the angular velocity and the acceleration, wherein:

the calculation operation includes:

a radius-of-rotation calculation operation for calculating a radius of rotation from a velocity change found by time integration of the acceleration and the angular velocity, a velocity calculation operation in which during a given time from exposure start, velocity is calculated based on the angular velocity and the radius of rotation calculated before exposure start, and after the given time passes by, the acceleration is cumulatively added to the velocity detected during the given time to calculate the velocity, and an amount-of-movement calculation operation for time-integrating the velocity calculated in the velocity calculation operation to calculate the amount of movement.

EMBODIMENTS OF THE INVENTION

Some embodiments of the invention are now explained with reference to the accompanying drawings. FIGS. 1 to 8 show specific embodiments of the invention, and FIG. 1 in particular is a perspective view of the type of rotational motions occurring in the imaging apparatus.

First of all, the coordinate system and directions of rotation set on an imaging apparatus 1 (including various apparatus capable of taking images such as digital cameras, video cameras, and cellular phones equipped with camera functions, and typically called the camera 1) are explained with reference to FIG. 1.

The camera 1 comprises an optical system 2 for imaging light from an object as an object image, with the Z direction defined by the axial direction of the optical system 2. More specifically, the positive Z direction is defined by a direction of the camera 1 facing the object. In the standard attitude (so-called lateral position) of the camera 1, the X direction is defined by the horizontal direction of the camera 1. More specifically, the positive X direction is defined by a right direction as viewed from the object side toward the camera 1 (i.e., a left direction as viewed from the camera operator toward the camera 1). Further in the standard attitude of the camera 1, the Y direction is defined by a vertical direction to the camera 1. More specifically, the positive Y direction is defined by an upward direction in the standard attitude.

Figure 1:
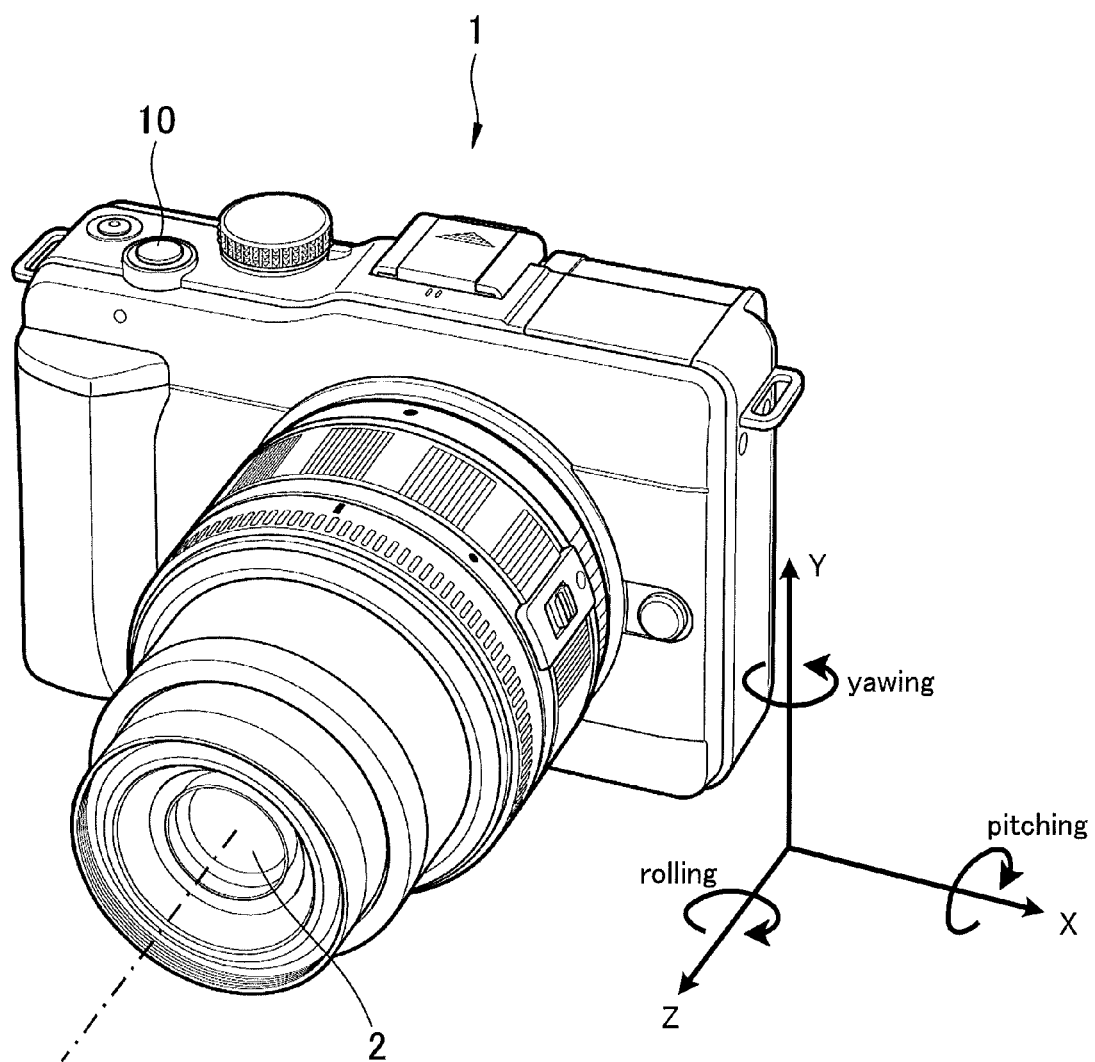
FIG. 1 is illustrative of the type of rotational motion occurring in the imaging apparatus according to an embodiment of the invention.

FIG. 1 is drawn such that the origin position of the coordinate system is shifted to prevent the coordinate system from being difficult to see due to overlapping with the camera 1; however, the origin of the coordinate system lies in the center of the imaging plane of an imaging device 4 (see FIG. 3), which is generally the point of intersection of the imaging plane with the optical axis of the optical system 2. This coordinate system is the one fixed to the camera 1, and if the camera 1 moves or rotates, the coordinate system, too, will move or rotate with respect to the earth. Note here that the X-Y plane of the coordinate system is in coincidence with the imaging plane.

In such a coordinate system, rotational motion around the Z axis provides rolling, rotational motion around the X axis provides pitching, and rotational motion around the Y axis provides yawing. Further in what follows, for instance, suppose that left rotation around the Z axis as viewed from the origin in the positive direction of the Z axis defines the positive direction of rolling rotation, left rotation around the X axis as viewed from the origin in the positive direction of the X axis defines the positive direction of pitching rotation, and right rotation around the Y axis as viewed from the origin in the positive direction of the Y axis defines the positive direction of yawing rotation.

It is here to be noted that the positive and negative directions of the above-mentioned coordinate axes and the positive and negative directions of rotation are optionally defined depending on the mounting direction of the angular velocity sensor assembly 8 and acceleration sensor 9 to be described later (see FIG. 3 and so on) and, hence, they are not theoretically limited to the above.

Referring here to the above-mentioned coordinate system, shakes occurring such as when the center of rotation lies in the origin (or the center of rotation inclusive of the origin lies in the camera 1), for the most part, are angular shake, and there is angular shake plus parallel shifting shake when the center of rotation lies outside the camera 1. In other words, such parallel shifting shake as must be corrected may be considered to occur when the center of rotation lies substantially outside the camera 1.

First, angular shake may be described as rotational motion around the origin. It is well known in the art that as the optical axis shakes from side to side with rotational motion in the yawing direction, it causes the range of the object imaged on the imaging device 4 to move from side to side, and as the optical axis shakes up or down with the rotational motion in the pitching direction, it causes the range of the object imaged on the imaging device 4 to move up or down. It is also well known in the art that rotational motion in the rolling direction causes the screen to be positioned laterally or longitudinally, or obliquely in between.

On the other hand, parallel shifting shake may be described as rotational motion with the center of rotation lying outside the camera 1. FIG. 2(A) is illustrative of how the amount of movement in the X direction occurs by yawing rotation in the imaging apparatus, FIG. 2(B) is illustrative of how the amount of movement in the Y direction occurs by pitching rotation in the imaging apparatus, and FIG. 2(C) are illustrative of how the amounts of movement in the X and Y directions occur by rolling rotation in the imaging apparatus.

As the camera 1 experiences rotational motion in the yawing direction having its center of rotation Cyaw in a position outside the camera 1 and away from the origin by a distance Ryaw (the radius of rotation), there is the amount of movement occurring in the X direction, as shown in FIG. 2(A). As the camera 1 experiences rotational motion in the pitching direction having its center of rotation Cpitch in a position outside the camera 1 and away from the origin by a distance Rpitch (the radius of rotation), there is the amount of movement occurring in the Y direction, as shown in FIG. 2(B). As the camera 1 experiences rotational motion in the rolling direction having its center of rotation Croll in a position outside the camera 1 and away from the origin by a distance Rroll (the radius of rotation), there is generally the amount of movement occurring, inclusive of an amount-of-movement component in the X direction and an amount-of-movement component in the Y direction, as shown in FIG. 2(C).

Of angular shake and parallel shifting shake, the former angular shake may appropriately be processed by known techniques: a specific embodiment of the invention here will be explained mainly with reference to the latter parallel shifting shake.

Figure 3:
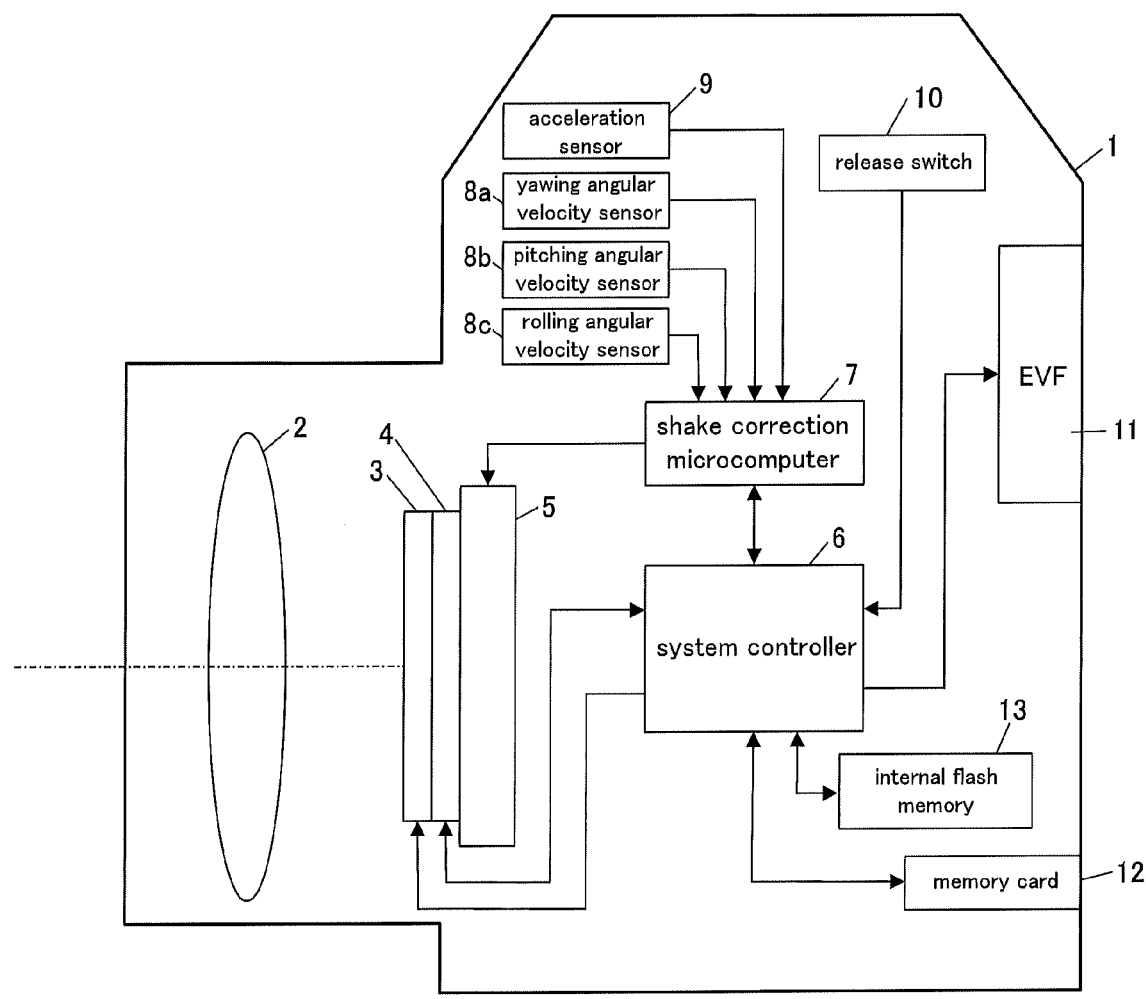
FIG. 3 is a block diagram illustrative of the architecture of the imaging apparatus according to an embodiment of the invention.

Referring first to FIG. 3, the architecture of the imaging apparatus 1 is shown in block diagram form. A camera 1 that is the imaging apparatus comprises an optical system 2, a focal plane shutter 3, an imaging device 4, a drive block 5, a system controller 6, a shake correction microcomputer 7, angular velocity sensors 8a, 8b and 8c, an acceleration sensor 9, a release switch 10, an EVF (electronic view finder) 11 and an internal flash memory 13. Although there is a memory card 12 shown in FIG. 3, it is to be understood that the memory card 12 may typically be attachable to and detachable from the camera 1; it is not always an inherent part in the camera 1.

The optical system 2 is provided to image light from an object as an object image that is formed on the imaging plane of the imaging device 4.

The focal plane shutter 3 is located on the front surface of the imaging device 4 (on the side of the optical system 2) to implement closing/opening operation thereby controlling exposure time. That is, the focal plane shutter 3 is closed for keeping the imaging device 4 exposed to light and opened for blocking the imaging device 4 off light.

The imaging device 4 transforms the object image formed on the imaging plane into electric signals in response to an instruction from the system controller 6. The transformed electric signals are read by the system controller 6 in the form of image signals.

The drive block 5 supports the imaging device 4 such that it is movable in parallel shifting two-dimensional directions within the imaging plane, and drives the imaging device 4 in the X and Y directions as shown in FIG. 1 or the like in response to an instruction from the shake correction microcomputer 7.

The system controller 6 is provided for integral control of a variety of control operations including reading of the aforementioned image signals and over the whole function of the camera 1. As described just below, the system controller 6 also allows the shake correction microcomputer 7 to implement shake detection and make shake correction on the basis of the result of shake detection.

Being designed as an angular velocity detection block for detecting rotational motion applied to the casing of the imaging apparatus 1, the angular velocity sensor assembly 8 detects an angle change per unit time as an angular velocity that is then sent out to the shake correction microcomputer 7. Including a yawing angular velocity sensor 8a serving as a yawing angular velocity detection block (the second angular velocity detection block) for detecting a yawing angular velocity about such yawing rotational motion around the Y axis (the second axis) as shown in FIG. 2A, a pitching angular velocity sensor 8b serving as a pitching angular velocity detection block (the first angular velocity detection block) for detecting a pitching angular velocity about such pitching rotational motion around the X axis (the first axis) as shown in FIG. 2B, and a rolling angular velocity sensor 8c serving as a rolling angular velocity detection block (the third angular velocity detection block) for detecting such a rolling angular velocity about rolling rotational motion around the Z axis (the third axis) as shown in FIG. 2C, the angular velocity sensor assembly 8 is designed to detect an angular velocity having 3 degrees of freedom in the rotational direction.

These yawing, pitching and rolling angular velocity sensors 8a, 8b and 8c are adapted to detect rotational motion around each axis by using the same type sensor to make mounting directions different.

The acceleration sensor 9 serves as an acceleration detection block capable of detecting at least accelerations applied to the casing of the imaging apparatus 1 in the X and Y axial directions (X acceleration and Y acceleration). In the embodiment of the invention here, the acceleration sensor 9 is also capable of detecting acceleration in the Z axial direction (Z acceleration). Then, the acceleration sensor 9 sends the accelerations detected in the respective directions out to the shake correction microcomputer 7.

In response to an instruction from the system controller 6, the shake correction microcomputer 7 calculates the amount of shakes of the camera 1 from the outputs of the angular velocity sensor assembly 8 and acceleration sensor 9. Then, the shake correction microcomputer 7 sends an instruction out to the drive block 5 to drive the imaging device 4 in a direction opposite to the detected shake direction by the detected amount of shakes, thereby allowing the drive block 5 to drive the imaging device 4 in such a way as to cancel out shakes on the imaging plane, resulting in prevention of shakes from occurring at the taken image. While the imaging device 4 is driven for shake correction, it is to be understood that instead of or in addition to this, the optical system 2 may be driven for shake correction.

In the embodiment of the invention here, the amount-of-shake sensing apparatus is constructed from, and includes, the shake correction microcomputer 7, angular velocity sensor assembly 8 and acceleration sensor 9, and the shake correction device is constructed from, and includes, this amount-of-shake sensing apparatus and the drive block 5.

The release switch 10 comprises, for instance, a two-stage press-switch connected to the system controller 6, wherein the first-stage pressing (half-pressing or the $1^{st}$ release) enables AF and AE, and the second-stage pressing (full-pressing or the $2^{nd}$ release) sets off exposure.

The EVF 11 is a display block constructed from, and includes, a liquid crystal panel and so on, displaying image signals read out of the imaging device 4 and transformed as by the system controller 6 into a displayable format such that the user can view them.

The memory card 12 is a nonvolatile recording medium capable of recording image signals read out of the imaging device 4 and transformed as by the system controller 6 into a recordable format, and may typically be detachably attached to the camera 1 as described above.

The internal flash memory 13 is a nonvolatile recording medium capable of recording the control program for the camera 1 that is run by the system controller 6, and various parameters used for control.

Figure 4:
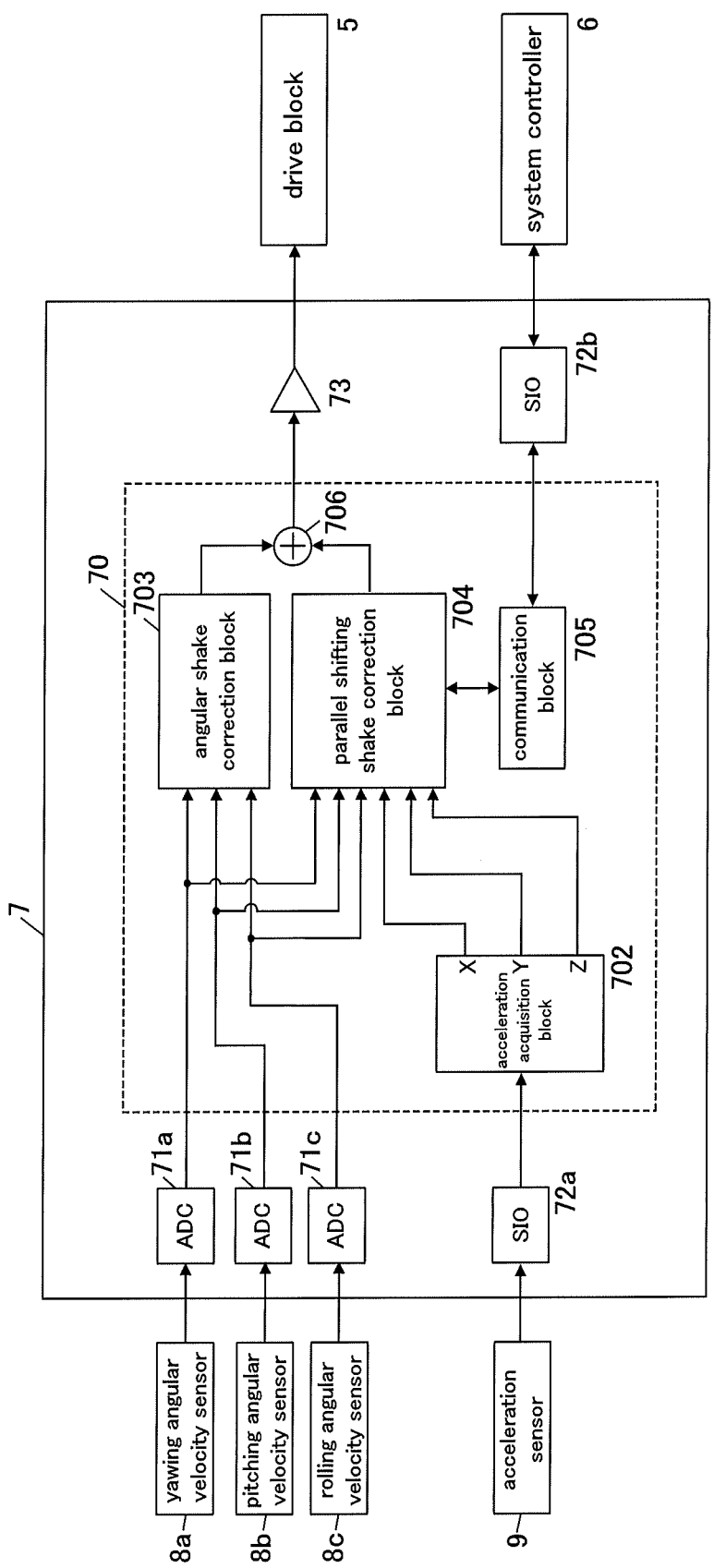
FIG. 4 is a block diagram illustrative of the architecture of the amount-of-shake correction microcomputer according to an embodiment of the invention.

FIG. 4 is a block diagram illustrative of the architecture of the shake-correction microcomputer 7 comprising a CPU 70, ADCs (analog/digital converters) 71a, 71b and 71c, SIOs (serial inputs/outputs) 72a and 72b, and a driver 73.

ADCs 71a, 71b and 71c are provided to convert analog signals entered from the angular velocity sensors 8a, 8b and 8c, respectively, into digital signals.

SIOs 72a and 72b form a communication block that enables CPU 70 to communicate with an external device via interfaces: SIO 72a is used for CPU 70 to read the value of acceleration detected by the acceleration sensor 9, and SIO 72b is used for CPU 70 to communicate with the system controller 6 for an exchange of commands.

The driver 73 produces out signals for driving the drive block 5 on the basis of the amount of correction calculated by CPU 70.

CPU 70 comprises an acceleration acquirement block 702, an angular shake correction block 703, a parallel shifting shake correction block 704, a communication block 705 and an addition block 706 typically in the form of a function set up by a firmware (that may of course be set up as a hardware), and calculates the amount of correction of angular shake and parallel shifting shake on the basis of the results of detection by the angular velocity sensor assembly 8 and acceleration sensor 9.

Figure 2:
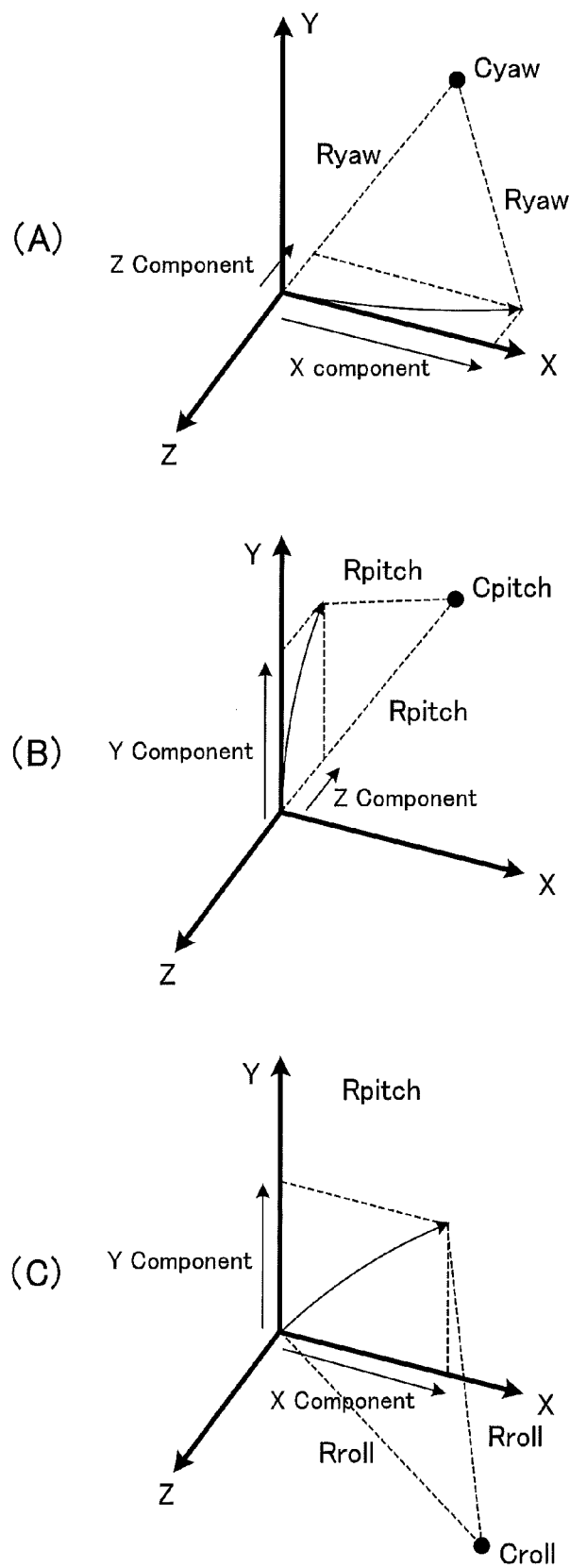
FIG. 2 is illustrative of the amount of movement in the X, Y and Z directions at the time when yawing rotation, pitching rotation and rolling rotation occur in the imaging apparatus according to an embodiment of the invention.

The acceleration acquirement block 702 reads the triaxial accelerations independent from the acceleration sensor via SIO 72a to divide them into acceleration information in the respective X, Y and Z-axis directions as shown in FIG. 2 or the like. Then, the acceleration acquirement block 702 sends the acquired X and Y accelerations out to the parallel shifting shake correction block 704.

The angular shake correction block 703 calculates the amount of shake (angular shake) in association with angle changes on the basis of yawing rotational motion and pitching rotational motion; however, there are no details given of this angular shake because known techniques may optionally be used for it.

The parallel shifting shake correction block 704 (corresponding to the calculator according to the invention) calculates the amount of parallel shifting movement of the camera 1 on the basis of acceleration and angular velocity, and transforms the calculated amount of movement into the amount of shake of the object image on the imaging plane, transmitting it to the drive block 5 as the amount of correction.

The communication block 705 communicates with the system controller 6 via SIO 72b.

The addition block 706 adds the amount of angular shake calculated by the angular shake correction block 703 to the amount of parallel shifting shake calculated by the parallel shifting shake correction block 704 to send the total sum of shake out to the driver 73.

It is here to be noted that the outputs of ADC 71a, 71b and 71c and the accelerations produced out of the acceleration acquisition block 702 in the respective X, Y and Z directions may be subjected to high-pass filtering processing or offset correction processing for removal of low-frequency components. By way of example but not by way of limitation, the low-frequency component to be here removed includes frequency components of up to 1 Hz as an example. Frequencies based on camera-shake are experimentally found to lie between about 1 Hz and about 10 Hz, indicating that it is possible to remove components changing with time due to sensor movements caused by factors other than camera-shake (for instance, drifts).

Further, if the accelerations acquired in the acceleration acquisition block 702 in the respective directions are corrected for gravity, then it is possible to improve the precision of calculation of the amount of shake in the parallel shifting shake correction block 704.

Figure 5:
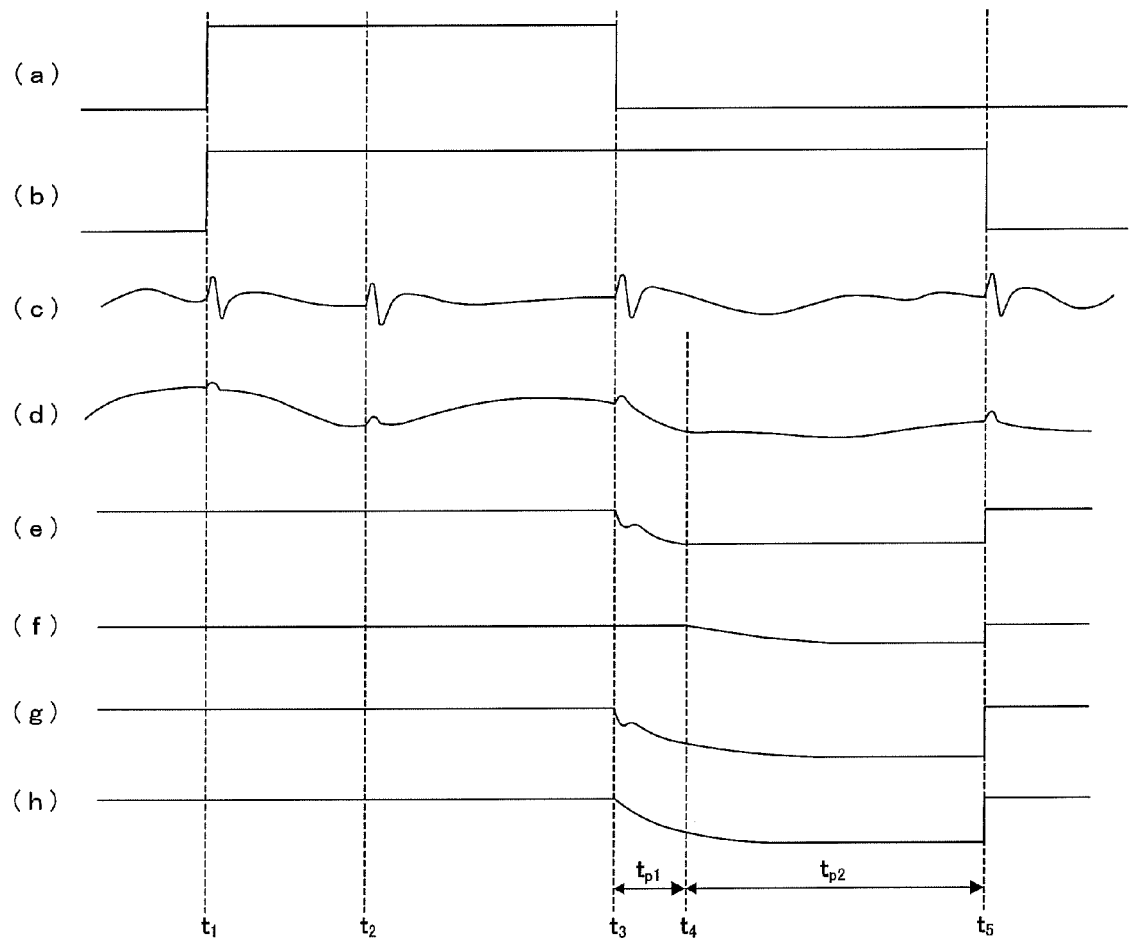
FIG. 5 is a timing chart of the imaging apparatus according to an embodiment of the invention.

FIG. 5 is a timing chart for the imaging apparatus according to one embodiment of the invention: FIGS. 5(a) and 5(b) are indicative of a front curtain control signal and a rear curtain control signal, respectively, for controlling the respective curtains of the focal plane shutter 3. The front (rear) curtain is adsorbed in place by magnetic force when this front (rear) curtain control signal remains high.

FIG. 5(c) is indicative of acceleration or the output of the acceleration sensor 9, and impact noises induced by the operation of the focal plane shutter 3 are seen in the timing chart.

FIG. 5(d) is indicative of angular velocity or the output of the angular velocity sensor assembly 8 that is found to be affected by the operation of the focal plane shutter as is the case with acceleration. However, it is not affected as much as the acceleration.

Figure 6:
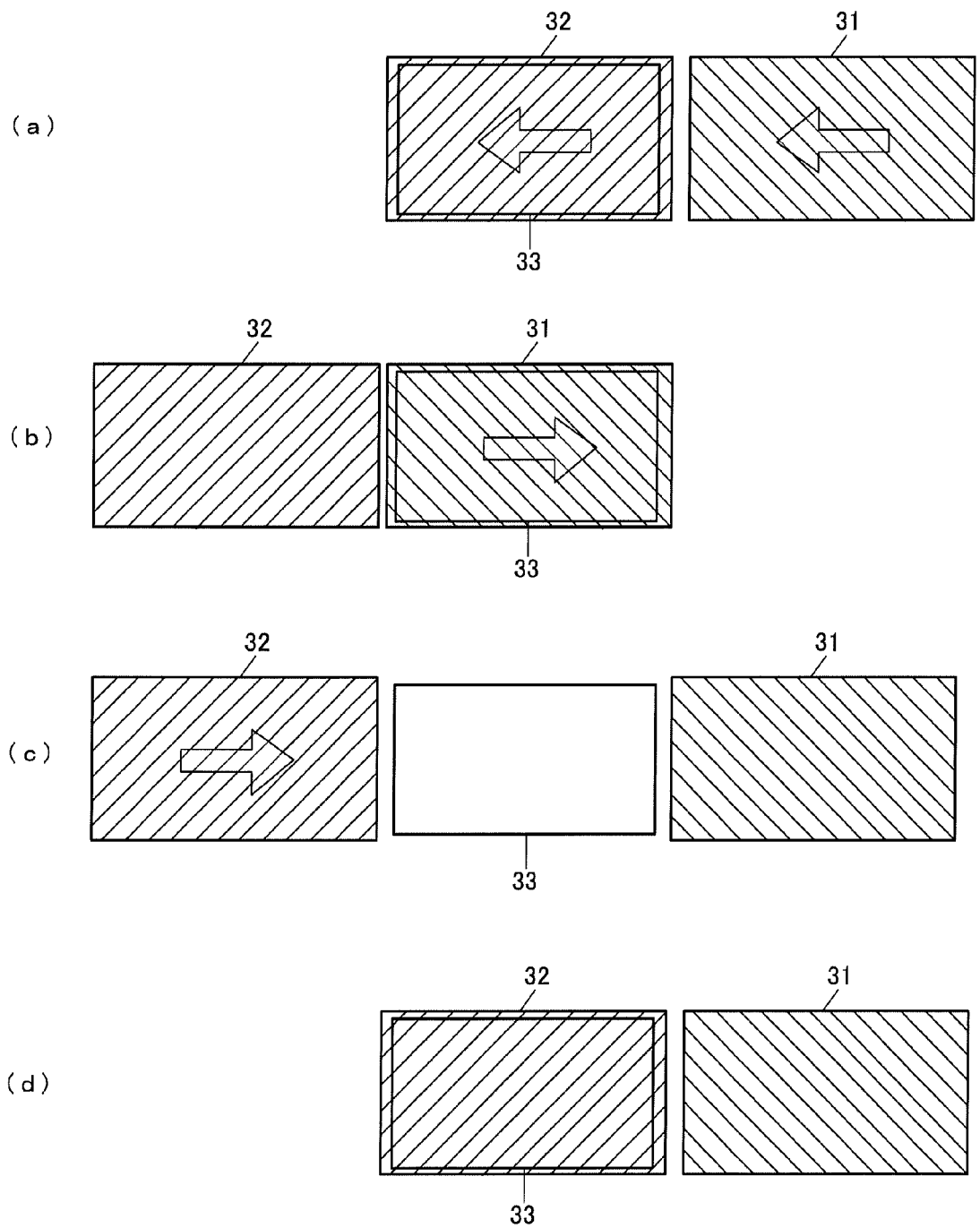
FIG. 6 is illustrative in schematic of the principles of the focal plane shutter according to an embodiment of the invention.

In FIG. 5, $t_1$ to $t_5$ are indicative of timings concerning impacts generated from the operation of the focal plane shutter 3, and FIG. 6 is illustrative of how the focal plane shutter 3 operates. The focal plane shutter 3 is constructed from, and includes, an optical aperture 33, a movable front curtain 31, a rear curtain 32 and a lever (not shown) for driving to each of the movable front curtain 31 and a rear curtain 32. The optical aperture 33 is located between the optical system 2 and the imaging device 4 to leave the imaging device 4 exposed to light when not blocked off by the front curtain 31 and the rear curtain 32.

In the timing chart, $t_1$ is a timing substantially matching a timing of entering an instruction of setting off camera operation. This instruction of setting off camera operation is generated from the operation by the camera operator (user) of the release switch (release SW) on the imaging apparatus 1, and so on. This $t_1$ substantially matches a timing at which adsorption of the curtain of the focal plane shutter 3 starts to produce impacts. Just at timing $t_1$ when the front curtain 31 moves from the state of FIG. 5(a) to the state of FIG. 5(b), there is an impact generated. This movement of the front 31 and the rear curtain 32 is implemented by driving the lever for movement of them. Timing $t_2$ comes from impacts given upon retraction of the lever with the curtains adsorbed to it.

At timing $t_3$ or upon closure of the front curtain 31, i.e., when the front curtain 31 moves from the state of FIG. 5(b) to the state of FIG. 5(c), there is an impact generated. As can also be seen from FIG. 5(c), $t_3$ matches an exposure start timing at which the optical aperture 33 opens.

Timing $t_4$ is a given time $t_{p1}$ elapsing from $t_3$, indicating a timing when the influence of the impact by the front curtain 31 on acceleration passes away. The extinction time of the impact varies depending on the characteristic performances of the imaging apparatus 1 such as the characteristics performance of the focal plane shutter 3, and a variety of conditions such as conditions for the camera operator to hold the imaging apparatus 2. Alternatively, this given time $t_{p1}$ may be adjusted on the basis of an acceleration state. Specifically, it is possible to monitor changes of acceleration with time and give $t_4$ to a time when the impact occurring at $t_3$ is judged as passing away, thereby determining the given time $t_{p1}$ having a time length corresponding to the generated impact.

At timing $t_5$ or upon closure of the rear curtain 32, i.e., when the rear curtain 32 moves from the state of FIG. 5(c) to the state of FIG. 5(d), there is an impact generated. As can also be seen from FIG. 5(d), timing $t_5$ matches an exposure end timing when the optical aperture 33 is blocked off. In other words, the time duration between $t_3$ and $t_5$ is an exposure duration in which the optical aperture 33 remains open.

In the embodiment of the invention here, the velocity and the amount of parallel shifting shake (the amount of movement in the invention) in the given duration $t_{p1}$ ($t_3$ to $t_4$ duration) from the start of exposure and in the exposure duration after the given time are calculated on the basis of the acceleration indicated in FIG. 5(c) and the angular velocity indicated in FIG. 5(d). In the embodiment of the invention here, the velocity in the duration $t_{p1}$ is calculated on the basis of the radius of rotation and angular velocity worked out just before and in a duration $t_{p2}$ the velocity is calculated by using the method for the duration $t_{p1}$ to cumulatively add accelerations to the velocity at the time $t_4$. The amount of translation shake is then calculated by time-integrating the velocity calculated for each time.

Thus, the embodiment of the invention here is designed such that at the given time from the start of exposure in the exposure duration, at which the impact generated from the movable part such as the shutter reaches a maximum, the velocity is calculated using the radius of rotation worked out before the generation of the impact (just before $t_1$ herein) to minimize the influence of that impact.

After the lapse ($t_4$ to $t_5$) of a given time when the impact is supposed to pass away, on the other hand, the velocity is calculated by cumulatively adding accelerations, as needed, to the initial velocity at the time $t_4$. The reason is that while the calculation of the velocity by cumulative addition of accelerations over an extended period of time gives rise to increases in errors, errors in association with accumulation will decrease if that calculation is limited to a shorter period time, viz., the exposure duration, resulting in the ability to detect relatively accurate velocity changes. In the calculation of the velocity using the radius of rotation, on the other hand, there is limitation on the timing of calculating the velocity using the radius of rotation, because the precise radius of rotation can only be calculated such as when the angular velocity of rolling is zero. According to the embodiment of the invention here, after the lapse of the given time in the exposure duration, accelerations are cumulatively added to the initial velocity at the time $t_4$ so that the precision of calculation of the velocity can grow high.

FIG. 5(e) is indicative of the velocity calculated on the basis of the angular velocity and the radius calculated just before time $t_1$ or the value used for calculation of parallel shifting shake in the duration $t_{p1}$.

FIG. 5(f) is indicative of the velocity change calculated by integration of the acceleration in the duration $t_{p2}$. This velocity change is added to the velocity at the time $t_4$ in terms of the radius of rotation to calculate the velocity for calculating the amount of parallel shifting shake in the duration $t_{p2}$.

FIG. 5(g) is indicative of the value wherein FIGS. 5(e) and 5(f) are added up. This value provides the velocity used for calculation of the amount of parallel shifting shake in the exposure duration ($t_3$ to $t_5$).

FIG. 5(h) is indicative of the value obtained by time-integration of the velocity shown in FIG. 5(g) and corresponding to the amount of parallel shifting shake.

As explained above, the radius of rotation is calculated until just before the start of image-taking operation (just before $t_1$); in the duration ($t_3$ to $t_4$) from the exposure start timing ($t_3$) to the time when the shutter impact keeps on having influences, the amount of parallel shifting shake is calculated on the basis of the result of detection of the angular velocity relatively less susceptible to impacts; and after the influences of impacts pass away ($t_4$ to $t_5$), the amount of parallel shifting shake is calculated on the basis of the value of acceleration.

It is thus possible to make the correction duration based on the radius of rotation shorter, thereby holding back influences of radius-of-rotation changes. It is also possible to cumulatively add accelerations, as needed, to the velocity calculated just before the impact passes away and on the basis of the radius of rotation, thereby preventing accumulation of errors stemming from long-term integration and holding back impacts from the shutter.

Figure 7:
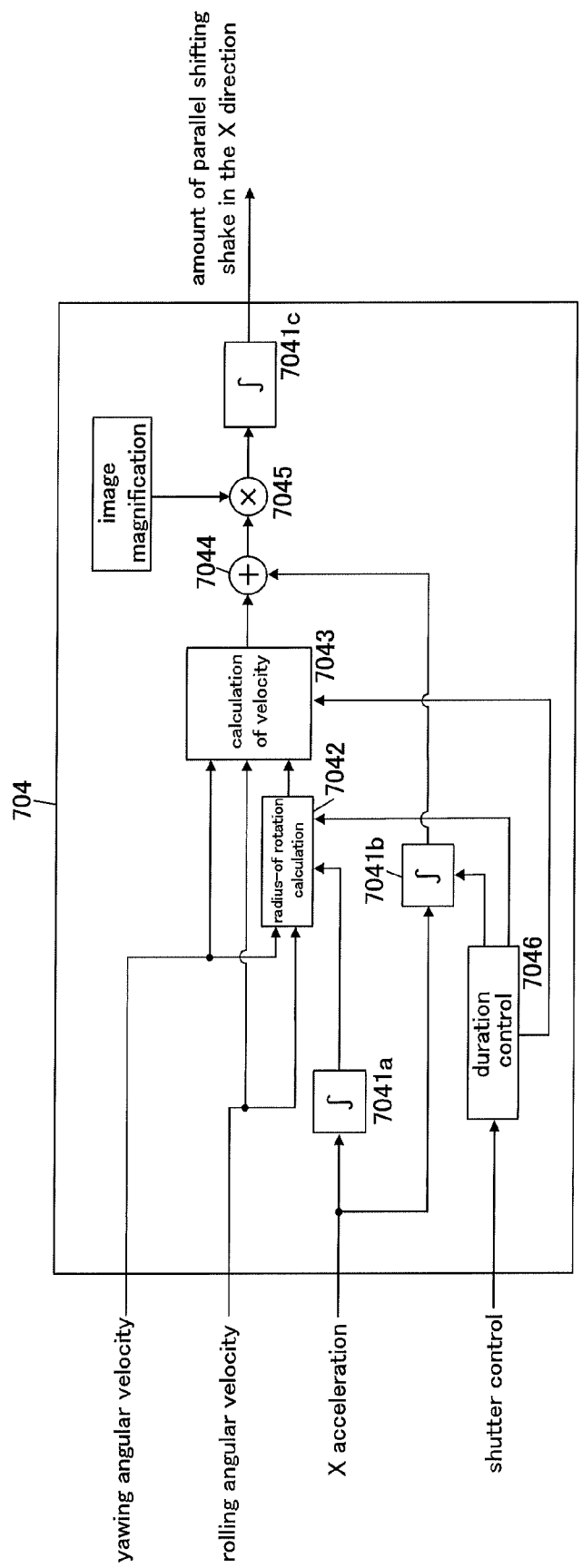
FIG. 7 is a block diagram illustrative of the architecture of the parallel shifting shake correction block according to an embodiment of the invention.

FIG. 7 is a block diagram illustrative in detail of the parallel shifting shake correction block 704 capable of detecting the amount of parallel shifting shake in the X direction with respect to the imaging plane; however, the amount of parallel shifting shake in the Y direction may also be detected using the input signals provided by a pitching angular velocity rather than a yawing angular velocity and Y acceleration rather than X acceleration. The otherwise architecture is neither explained nor illustrated because of bearing similarities.

The parallel shifting shake correction block 704 is constructed from, and includes, integration blocks 7041a to 7041c, a radius-of-rotation calculation block 7042, a velocity calculation block 7043, an addition block 7044, a multiplication block 7045, and a duration control block 7046.

The integration block 7041a is operable to time-integrate the entered acceleration (X acceleration) to calculate the velocity for working out the radius of rotation.

The integration block 7041b is also operable to time-integrate the entered acceleration (X acceleration), but it is provided for the integration of an acceleration in the integration duration, detected in the duration control block 7046. In other words, the acceleration is time-integrated in the duration $t_{p2}$ explained with reference to FIG. 5(f).

The integration block 7041c is operable to time-integrate the calculated parallel shifting velocity on the imaging plane to calculate the amount of parallel shifting shake in the X direction. This is the output of the parallel shifting shake correction block 704 or the value corresponding to FIG. 5(h). The integration block 7041c is corresponding to the amount-of-movement calculation processing according to the invention.

The radius-of-rotation calculation block 7042 is operable to execute radius-of-rotation calculation operation thereby calculating the radius of rotation from the entered angular velocity (yawing and rolling angular velocities) and the velocity worked out in the integration block 7041a. Here the radii of rotation in the yawing and rolling directions are calculated. That reason is that, as explained with reference to FIGS. 2(A) and (C), the influences with respect to the X direction are affected by the rotational movements in the yawing and rolling directions. Note here that the radius of rotation in the Y direction may be found from such pitching vs. rolling relations as shown in FIGS. 2(B) and (C).

Suppose here that $V_X$ is the velocity in the X direction, $R_{yaw}$ is the radius of rotation in the yawing direction (radius of yawing), $R_{rollX}$ is the radius of XZ rolling corresponding to the radius of projection of the radius of rolling direction rotation onto the Z-X plane, and $\omega_{roll}$ is the rolling angular velocity. The following relation then holds from the radius of rotation and the angular velocity:

$$V_X = R_{yaw} \times \omega_{yaw} + R_{rollX} \times \omega_{roll} \quad \text{(Equation 1)}$$

Also suppose here that $V_{X1}$ and $V_{X2}$ are the X-direction velocities at different points of time, $\omega_{yaw1}$ and $\omega_{yaw2}$ are the yawing angular velocities, and $\omega_{roll1}$ and $\omega_{roll2}$ are the rolling angular velocities. The following relations then hold:

$$V_{X1} = R_{yaw} \cdot \omega_{yaw1} + R_{roll} \cdot \omega_{roll1} \quad \text{(Equation 2)}$$

$$V_{X2} = R_{yaw} \cdot \omega_{yaw2} + R_{roll} \cdot \omega_{roll2} \quad \text{(Equation 3)}$$

From Equations 2 and 3, the radius of yawing $R_{yaw}$ and the radius of XZ rolling $R_{rollX}$ may be found as follows.

$$R_{yaw}=(V_{X2}\cdot\omega_{roll1}-V_{X1}\cdot\omega_{roll2})/(\omega_{roll1}\cdot\omega_{yaw2}-\omega_{yaw1}\cdot\omega_{roll2})$$ (Equation 4)

$$R_{rollX}=(V_{X2}\cdot\omega_{yaw1}-V_{X1}\cdot\omega_{yaw2})/(\omega_{yaw1}\cdot\omega_{roll2}-\omega_{yaw2}\cdot\omega_{roll1})$$ (Equation 5)

It is here to be noted that the velocity calculated in the integration block 7041a is used for $V_{X1}$ and $V_{X2}$, and the yawing and rolling angular velocities entered in the radius-of-rotation calculation block 7042 are used for $\omega_{yaw1}$, $\omega_{yaw2}$, $\omega_{roll1}$ and $\omega_{roll2}$.

It is also to be noted that the Y direction velocity $V_y$ may similarly be found from the radius of rotation $R_{pitch}$ in the pitching direction (radius of pitching), the pitching angular velocity $w_{pitch}$, the radius of XY rolling $R_{rollY}$ corresponding to the radius of projection of the rolling direction radius of rotation onto the X-Y plane, and the rolling angular velocity $\omega_{roll}$.

The velocity calculation block 7043 is operable to calculate the velocity $V_X$ on the basis of the radius of rotation calculated in the radius-of-rotation calculation block 7042. Specifically, the velocity $V_X$ is calculated by substituting the radii of rotation ($R_{yaw}$, $R_{rollX}$) represented by Equations 4 and 5 for Equation 1. However, the duration for calculating velocities is only the duration $t_{p1}$ judged on the basis of shutter control signals.

The addition block 7044 is operable to add up the velocity calculated in the velocity calculation block 7043 and the velocity changes calculated in the integration block 7041b to calculate the parallel shifting velocity corresponding to the output of FIG. 5(g). In the embodiment of the invention here, velocity calculation operation is executed by the addition block 7044, integration block 7041b, velocity calculation block 7043 and duration control block 7046.

The multiplication block 7045 is operable to multiply the calculated parallel shifting velocity of the camera body by the image magnification preset in the optical system 2 to transform it into the parallel shifting velocity of the object image on the imaging plane. The image magnification is sent by way of communication with the system controller 6 via the communication block 705.

The duration control block 7046 is operable to respond to the shutter control signals, gaining control of the duration for calculating the radius of rotation in the radius-of-rotation calculation block 7042, the duration $t_{p1}$ for calculating the velocity in the velocity calculation block 7043, and the duration $t_{p2}$ for time-integrating the acceleration in the integration block 7041b (cumulatively adding accelerations to the velocity produced out of the velocity calculation block 7043).

Normally, the duration control block is operable to calculate the radius of rotation while the radius-of-rotation calculation block 7042 is in operation. However, once the image-taking operation has started, however, the radius-of-rotation calculation block 7042 stops to calculate the radius of rotation at the timing $t_1$, ready for correction.

Then at the timing $t_3$ when exposure starts, the velocity calculation block 7043 starts to calculate the parallel shifting velocity from the radius of rotation and the angular velocity.

Then, the calculation of velocity is stopped at the timing $t_4$ when the shutter impact passes away to let the integration block 7041b set off the time integration of accelerations. In turn, this enables the velocity change by the time integration of accelerations in the integration block 7041b to be added from the addition block 7044 to the parallel shifting velocity calculated just before the timing $t_4$. In other words, the accelerations are going to be cumulatively added to the parallel shifting velocity at the timing $t_4$.

The duration control block 7046 operates such that the integration in the integration block 7041b comes to an end at the timing $t_5$ when exposure comes to an end, the result of integration in the integration block 7041b and the result of calculation of velocity in the velocity calculation block 7043 are cleared, letting the radius-of-rotation calculation bloc 7042 resume its operation.

It is here to be noted that in the parallel shifting shake correction block 704, high-pass filtering processing or offset correction processing may be applied to the entered yawing angular velocity, the rolling angular velocity, and the X acceleration or at least one of the outputs of the integration blocks 7041a, 7041b and 7041c for removal of low-frequency components. As is the case with processing of the outputs of ACDs 71a, 71b and 71c and the accelerations produced out of the acceleration acquisition block 702 in the respective X, Y and Z directions, frequencies of 1 Hz or less are here removed to get rid of the influences of the acceleration sensor 9 on temperatures, etc. and hence on drifts. This processing in the parallel shifting shake correction block 704 may be dispensed with if correction may be made of the outputs of the above-mentioned ACDs 71a, 71b and 71c and the accelerations produced out of the acceleration acquisition block 702 in the respective X, Y and Z directions.

Figure 8:
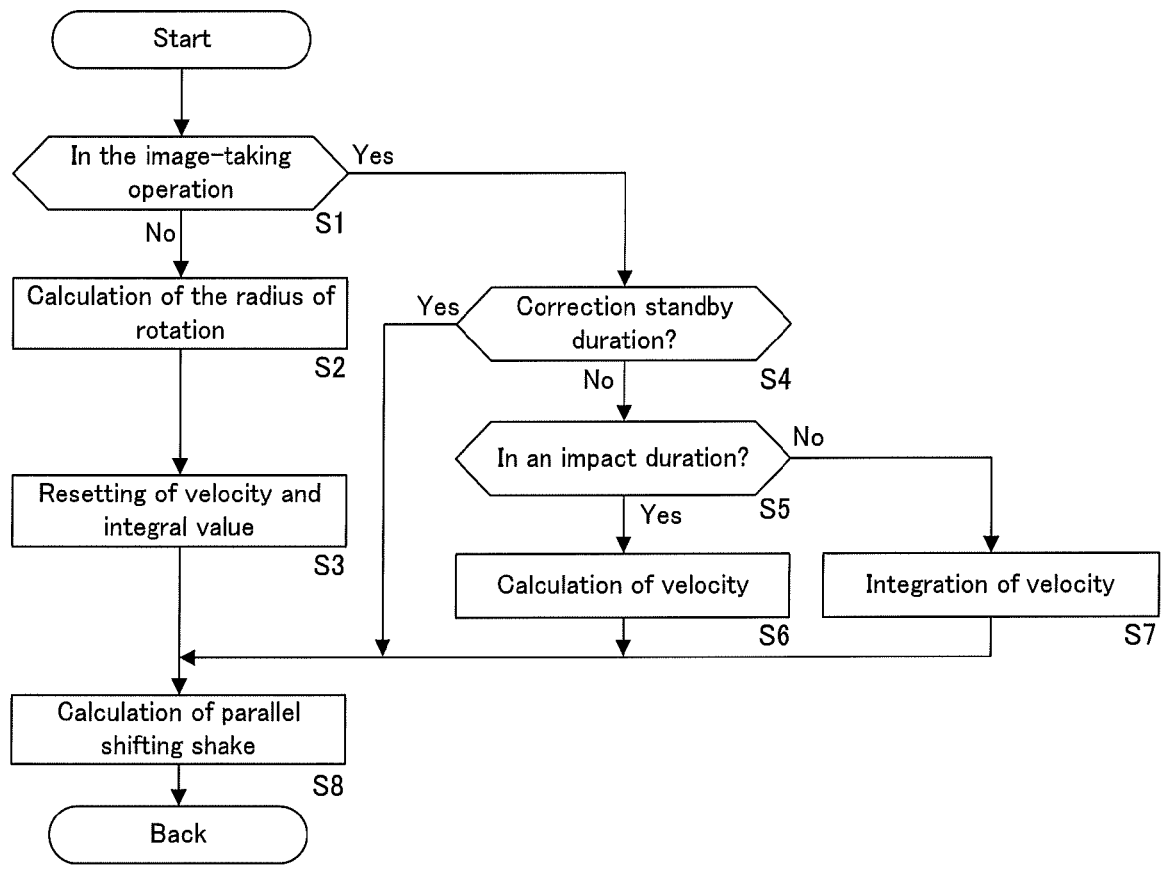
FIG. 8 is a flowchart indicative of how to control the detection of the amount of parallel shifting movement according to an embodiment of the invention.

Then, the flow of control of the parallel shifting correction block 704 is explained with reference to FIG. 8. Once the processing has started, whether or not the camera is in image-taking operation is first judged on the basis of the entered shutter control signal (S1). The image-taking operation is here defined by the duration between the rise of a front curtain control signal and the fall of a rear curtain control signal, i.e., the duration from $t_1$ to $t_5$ in FIG. 5.

When the camera is judged as being not in image-taking operation, the radius-of-rotation calculation block 7043 operates to calculate the radius of rotation (S2), and the outputs of the velocity calculation block 7043 and integration block 7041b are set (reset) to zero (S3). After going through S2 and S3, the amount of parallel shifting shake is not detected (remains zero) in S8 for calculating the amount of parallel shifting shake because the outputs of the velocity calculation block 7043 and integration block 7041b are zero.

When the camera is judged in S1 as being in image-taking operation (S1: Yes), on the other hand, whether or not it is a correction wait duration is judged. The correction wait duration here is understood to refer to $t_1$ when image-taking operation starts to $t_3$ when correction starts. In the correction standby duration (S4: Yes), no amount of parallel shifting shake is detected as is the case with going through S2 and S3, and S8 for calculating the amount of parallel shifting shake is taken over.

Then, when the camera is not in the correction standby duration, whether or not the camera is in the impact duration is judged (S5). The impact duration here is understood to refer to the duration $t_{p1}$. In the impact duration, the velocity is calculated in the velocity calculation block 7043 on the basis of the entered angular velocity and the radius of rotation calculated just before $t_1$ (S6), as already explained. In S8, the velocity calculated in S6 is integrated thereby calculating the amount of parallel shifting shake.

On the other hand, when the camera is not in the impact duration, the integral value in the integration block 7041b is added to the velocity at the time $t_4$ calculated in the velocity calculation block 7043 (S7). In S8, the velocity calculated in S7 is integrated thereby calculating the amount of parallel shifting shake.

In the duration in which the values of accelerations become inaccurate due to impacts generated from the movable parts such as a shutter or mirror, the amount of correction is calculated with the previously calculated radius of rotation and angular velocity. At the point of time when the acceleration takes effect, i.e., after the lapse of a given time from the generation of impacts, the accelerations are cumulatively added to the calculated velocity for velocity calculation. Accordingly, the duration of using the fixed radius of rotation is prevented from getting too long or the accelerations are prevented from accumulation, enabling calculation of parallel shifting velocity with no or little errors.

While some embodiments according to a certain aspect of the invention have been explained, it is to be understood that the invention is not only limited to them, but also some combinations of them may come under the category of the invention.

EXPLANATION OF THE REFERENCE NUMERALS

1 . . . camera (imaging apparatus)
2 . . . optical system
3 . . . focal plane shutter
31 . . . front curtain
32 . . . rear curtain
33 . . . optical aperture
4 . . . imaging device
5 . . . drive block
6 . . . system controller
7 . . . shake correction microcomputer
8 . . . angular velocity sensor assembly
8$a$ . . . yawing angular velocity sensor
8$b$ . . . pitching angular velocity sensor
8$c$ . . . rolling angular velocity sensor
9 . . . acceleration sensor
10 . . . release switch
11 . . . EVF (electronic view finder)
12 . . . memory card
13 . . . internal flash memory
71$a$-71$c$ . . . ADC (analog to digital convertor)
72$a$, 72$b$ . . . SIO (serial input/output)
73 . . . driver
702 . . . acceleration acquisition block
703 . . . angular shake correction block
704 . . . parallel shifting shake correction block
705 . . . communication block
706 . . . addition block
7041$a$, 7041$b$, 7041$c$ . . . integration block
7042 . . . radius-of-rotation calculation block
7043 . . . velocity calculation block
7044 . . . addition block
7045 . . . multiplication block
7046 . . . duration control block

What is claimed is:

1. An amount-of-shake sensing apparatus, comprising:
an angular velocity sensor which detects an angular velocity concerning rotational motion of a casing,
an acceleration sensor which detects an acceleration applied to the casing,
a movement calculator which calculates an amount of movement of the casing based on the angular velocity and the acceleration, wherein:
the movement calculator executes:
a radius-of-rotation calculation operation for calculating a radius of rotation from a change of an amount of a velocity found by time integration of the acceleration, and the angular velocity,
a velocity calculation operation in which during a given time from a start of exposure, the velocity is calculated based on the angular velocity and the radius of rotation calculated before the start of exposure, and after a lapse of the given time, the acceleration is cumulatively added to the velocity detected during the given time to calculate the velocity, and
an amount-of-movement calculation operation for time-integrating the velocity calculated in the velocity calculation operation to calculate the amount of movement.

2. The amount-of-shake sensing apparatus according to claim 1, wherein
the movement calculator executes:
the radius of rotation used for the velocity calculation operation has been calculated in the radius-of-rotation calculation operation before impacts are generated from a movable part operating in response to an image-taking operation start instruction.

3. The amount-of-shake sensing apparatus of claim 1, wherein the movement calculator executes:
the velocity calculation operation calculates a velocity in a first axis direction based on the radius of rotation, an angular velocity around a second axis vertical to the first axis direction and being detected for an amount of movement, and an angular velocity around a third axis vertical to the first axis and the second axis.

4. The amount-of-shake sensing apparatus according to claim 1, wherein the movement calculator executes:
the velocity calculation operation calculates a velocity in a second axis direction based on the radius of rotation, an angular velocity around a first axis vertical to a second axis direction and being detected for an amount of movement, and an angular velocity around a third axis vertical to the first axis and the second axis.

5. The amount-of-shake sensing apparatus according to claim 1, wherein the movement calculator executes:
the given time is adjusted based on the acceleration detected in the acceleration sensor.

6. An imaging apparatus, comprising:
an amount-of-shake sensing apparatus according to claim 1,
an optical system which images light from an object as an object image,
an imaging device which transforms an object image formed by the optical system into image signals, and
a drive unit which drives at least one of the optical system and the imaging device in a direction of canceling out the amount of movement calculated by the amount-of-shake sensing apparatus.

7. A method for detecting an amount of shakes, comprising steps of:
A detecting an angular velocity concerning rotational motion of a casing,
a detecting an acceleration applied to the casing, and
an executing calculation operation for calculating an amount of movement of the casing based on the angular velocity and the acceleration, wherein:
the calculation operation includes:
a radius-of-rotation calculation operation for calculating a radius of rotation from a change of a velocity found by time integration of the acceleration, and the angular velocity,
a velocity calculation operation in which during a given time from a start of exposure, the velocity is calculated based on the angular velocity and the radius of rotation calculated before the start of exposure, and after a lapse of the given time, the acceleration is cumulatively added to the velocity detected during the given time to calculate the velocity, and an amount-of-movement calculation operation for time-integrating the velocity calculated in the velocity calculation operation to calculate the amount of movement.

* * * * *